July 25, 1967 W. D. CARRIE 3,332,154
HYDRAULIC GAGE
Filed March 22, 1965 4 Sheets-Sheet 3

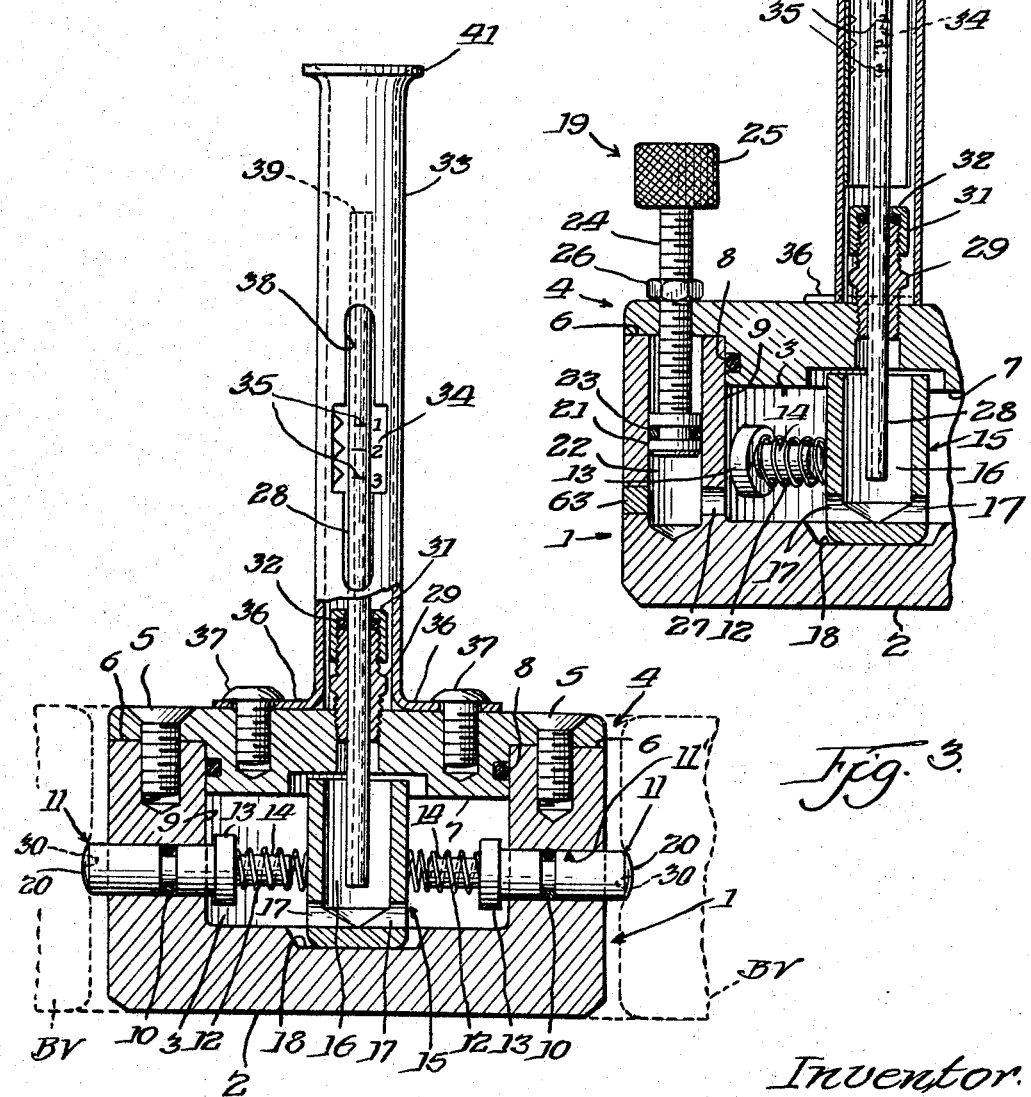

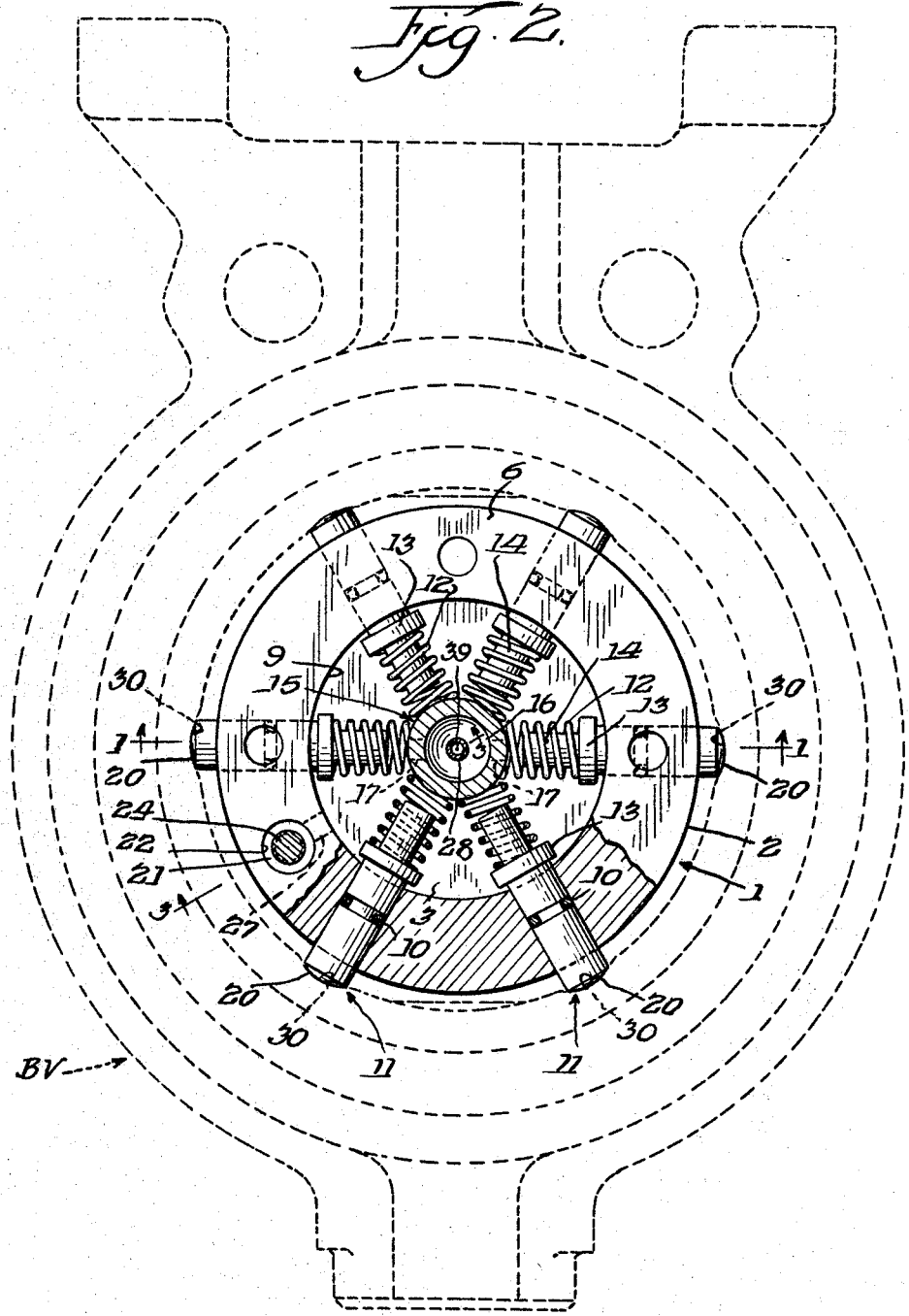

Inventor.
William D. Carrie.
By Joseph O. Lange
Atty.

July 25, 1967  W. D. CARRIE  3,332,154
HYDRAULIC GAGE

Filed March 22, 1965  4 Sheets-Sheet 4

Inventor
William D. Carrie.
By Joseph O. Lange
Atty.

United States Patent Office 3,332,154
Patented July 25, 1967

3,332,154
HYDRAULIC GAGE
William D. Carrie, Lisle, Ill., assignor to Crane Co.,
Chicago, Ill., a corporation of Illinois
Filed Mar. 22, 1965, Ser. No. 441,930
7 Claims. (Cl. 33—178)

This invention relates generally to plug and ring gages, and, more particularly, it is concerned with the type of the said gages actuated by a unique means of hydraulic or liquid displacement. As will hereinafter become more readily apparent, the gages of this invention have particular useful application in the field of valve measurements, such as those encountered in the manufacture of the butterfly type of valve shown in U.S. Patent No. 3,173,650, issued Mar. 16, 1965.

In order to have a better appreciation of the merits of this invention and the practical application of its use in the valve industry, it should be understood that it is obviously essential to measure accurately not only the inside diameter of the elastomer seat rings forming the peripheral seating engagement for a closure member, say, of the butterfly type, but also, and preferably simultaneously, measuring the hardness of the said elastomer seat rings. It should be understood that most frequently the said rings are of the molded-in type and therefore require an element of accuracy of a very high order if fluid tightness between the periphery of the rotatable valve closure member and the seat rings is to be successfully maintained.

The usual practice has been to measure the inside diameter of the rubber-like seat rings with what is known to the trade as an inside type of micrometer by taking a plurality of micrometer readings preferably uniformly spaced apart around the inner periphery of the said seat ring. This type of measurement obviously has depended upon the individual feel of the inspector or the person using the micrometer gage and his personal reaction to the resiliency encountered depending upon the hardness of the elastomer employed. It is thus obvious that the individual reaction for such resiliency response in measurement will vary when measuring the inside diameter.

In the past, the hardness encountered as measured by a durometer type of gage is dependent upon the experience and judgment of individual inspectors and because of the said resiliency variations, it is clear that in many instances no two inspectors agreed to an identical reading. Further, it should be understood that this type of gaging is at best very time consuming and even under the most careful circumstances is relatively inaccurate.

Therefore, it is one of the more important objects of this invention to provide for a hydraulic displacement type of measuring instrument capable of employing either a plug or a ring gage depending upon the type of measurement being sought. Said measurement can be done not only more accurately but also relatively quickly. This advantage of course is very important on the production and assembly lines upon which these valves must be produced if they are to be of high quality and commercially competitive.

Another equally important object is to provide for a type of gage in which the human element and its reaction is reduced to an insignificant factor since the gage upon mere positioning will reflect the condition encountered from a measurement and hardness standpoint without requiring personal adjustment or handling by the individual inspector.

Another important object of this invention is to provide for a gage in which the inside diameter of the rubber seat or the outside diameter of the closure member to be employed therewith is read directly and in which the hardness of the material encountered preferably constituting an elastomer or other rubber-like materials is apparent by the impingement of the anvil portions of the gage into said material and thereby being measured conveniently and with accuracy.

Another important object of this invention is to provide for a gage of the type hereinafter to be described in greater detail in which suitable magnification may be employed enabling not only the inside diameter to be readily classified, while also permitting the durometer type of measurements to be made concurrently within a desired range. Such accomplishment has been impossible when using prior methods.

A still further important object of the invention lies in the provision of a hydraulic type of gage in which measurement results therefrom will indicate the bubble tightness of the assembled valve. Because of the magnified reading obtained by the device of this invention, the valves by dimensional size and hardness control can be grouped or classified so that the size, such as the outside diameter of the closure member, can be controlled by the employment of a modified form of female gage. As will hereinafter become apparent, a controlled bubble tightness of the valve so gaged is thereby obtained which was not possible to accomplish by previous types of gages.

A further important object is to provide for a hydraulic displacement type of gage in which the arrangement of the gaging portions thereof provide for a convenient and relatively simple means for averaging the dimensions obtained during said gaging operation.

Another object is to provide for a gage in which the resilient means employed have been provided with as close a compression as is mechanically possible and to further balance the gage anvil loading, a novel floating spring retainer or equalizing cylinder is utilized.

Other objects and advantages will become more readily apparent upon proceeding with the following description read in light of the accompanying drawings, in which:

FIG. 1 is a sectional assembly view of a gage embodying my invention taken on the line 1—1 of FIG. 2.

FIG. 2 is a transverse sectional view of the gage shown in FIG. 1 as the gage is being applied to a butterfly valve having molded-in rubber seats and which is diagrammatically indicated in dotted lines;

FIG. 3 is a fragmentary sectional view taken on the line 3—3 of FIG. 2;

Similar reference numerals refer to similar parts throughout the several views.

Figure 4:
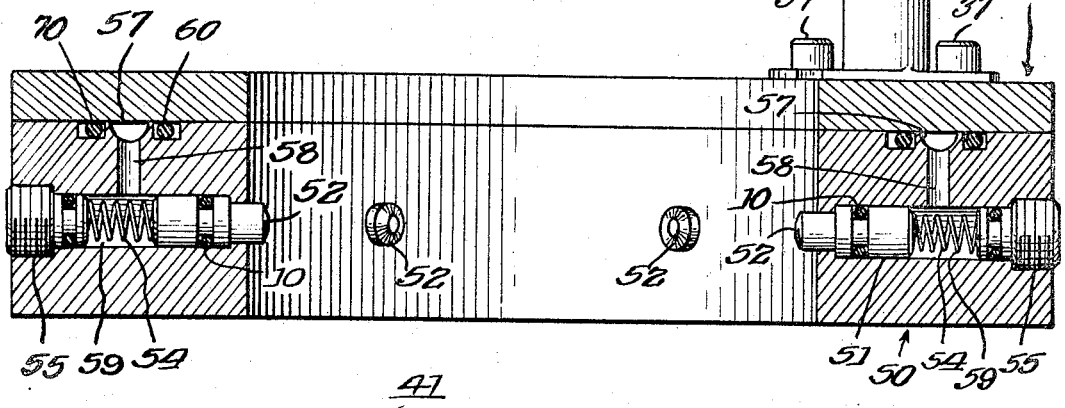
FIG. 4 is a view of a modified form of the gage described hereinabove, but with the instant form being adapted for measuring the peripheral surface or outside diameter of a butterfly valve closure member, said view being taken on the line 4—4 of FIG. 5.

Referring now to FIG. 1, a preferred form of the hydraulic displacement type of gage of this invention is shown generally designated 1 and is of the plug gage type. It consists of a body 2 having a substantially cylindrical chamber 3, the said chamber being closed by means of the cap generally designated 4 securely mounted thereon by means of the cap screws 5 to bear against the body upper surface 6. The cap 4 is provided with the lower depending guiding extension 7 having on its outer periphery sealing means such as the O-ring 8 snugly engaging the inner annular body surface 9 defining the chamber 3.

Radially extending through the walls defining the said chamber 3 and as more clearly shown in FIG. 2, a plurality of radially extending gaging plungers generally designated 11 are mounted for limited axial movement with interposed resilient means such as the springs 12, which have similar spring constants (K). The said plungers are fluid sealed in cylinders 11' formed in the body wall by means of the O-rings 10. The latter members bear against the annular collar or shoulder portion 13 at one end portion thereof as shown. At the opposite end and fitted over the reduced rod portion 14 of the gaging plungers 11, the coil springs bear against the outer annular surface of the equalizing cylinder generally designated 15. The latter member is hollow as indicated at 16 and at its lower end portion is open by means of the transverse passages as at 17. Said equalizing cylinder is normally supported upon the body recessed surface 18 as indicated to permit of limited transverse movement relative to the surface 18 in the manner hereinafter immediately to be described. The springs 12 are constructed so as to provide as close a compression as is mechanically possible and to further balance the gage anvil loading of the slidably movable gaging plungers 11. The transverse movement of the equalizing cylinder 15 occurs in response to said springs 12 mounted upon the gaging plungers 11. The latter members bear at 20 against the seat ring portion 30 being gaged, and the floating equalizing cylinder thus balances all of the springs.

In connection with a consideration of the operation of this novel gage and the performance and use of a hydraulic fluid therewith, it should be understood that the chamber 3 upon completing the assembly of the plurality of compensating plungers is filled with a liquid, preferably colored for ease of visibility, as hereinafter explained. Introduction of the liquid into the chamber 3 may be done preferably before the cap 4 is mounted and tightened into position, but other mountings as hereinafter understood will permit the introduction of such liquid. In connection with the application of the desired displacement of the liquid within the chamber 3, attention is now directed to FIG. 3 in which a compensating plunger generally designated 19 is mounted. Said compensating plunger has a lower plunger 21 snugly received within the chamber 22 with a suitable O-ring 23 and a threaded adjusting screw 24 having at its outer end portion the actuating knurled knob 25. Locknut 26 is used to lock the plunger 21 in predetermined axial position when the desired displacement of the liquid within the chamber 3 has been accomplished. The chamber 22 communicates with the chamber 3 by means of the passage 27. The latter passage at its outer portion is suitably plugged at 63.

Acted upon by the liquid within the respective chamber 3 and 22, the axially movable glass tubing 28 is arranged for fixed mounting within the bushing or compression type fitting 29. The latter member is threadably mounted as indicated and is provided with a retaining nut 31 for containing the O-ring 32 in fluid sealing position in relation to the glass tubing 28. Thus it will be clear that under the influence of the liquid displacement effected within the chamber 3 by the gaging plungers 11, the equalizing cylinder 15 will be moved transversely upon the body surface 18, and the tubing 28 will receive the rising liquid from within the chamber 3. For purpose of protection of the glass tubing member 28, a suitable indicator shield 33 is employed, preferably made of metal.

As shown more clearly in FIG. 1, the shield 33 is suitably calibrated as indicated at 34 to cooperate with the indicating notches or gaging increments 35 of the glass tubing 28. Thus, the visual indicator tubing 28 cooperates with the liquid rising from within the chamber 3 to serve as a sight gage to indicate to the observer the height or level of the liquid as is rises and in a direction toward the notches indicated at 35 on the glass tubing and gaging increments 34 of the shield 33. Said shield is suitably attached by means of the oppositely disposed flange portions 36 and attached to the cap 4 by means of the screws 37 as indicated in FIG. 1.

It will be appreciated that the transverse view of FIG. 2 is shown with the cap 4 removed.

For purpose of providing legibility with respect to determining the levels of the liquid, the shield 33 is cut away or relieved as at 38 to provide said legibility of the liquid level as indicated by the numerals 1, 2, and 3 corresponding with said notches 35 on the tubing 28.

In appreciating the manner of functioning of the gage of this invention, it should be noted that as the anvil ends 20 of the plungers 11 are received within the seating portion of the butterfly valve seat designated BV, the anvil portions 20 of plungers bear against the inside diameter of the elastomer valve seat and will be caused to move axially inwardly toward the chamber 3 depending upon the amount of resistance reflected by the combined inside diameter dimensions and the hardness of the seat ring of the valve BV. Compensation for possible variations encountered at different inner peripheral portions of the valve seat by the respective radially disposed plungers 11 will be reflected in the transverse movement of the equalizing cylinder 15 acting in such sliding movement on surface 18 under the influence of the coil springs 12 as the latter are in turn acted upon by the enlarged collar 13 of the plungers 11. It will also be understood that the glass tubing 28 is open at its outer end portion 39 in order to avoid a pressure condition within said tubing as the liquid from within chambers 3, 16, and passageways 17 enters said tubing. While the shield 33 is shown as being flanged at its upper end portion at 41, the manner in which this is formed is immaterial and depends upon the use or handling of the gage.

From the structural description thus far of the device exemplifying this invention, it should now be apparent that in one of its preferred uses the said gage device is inserted into the opening formed by the inside diameter of the rubber or other elastomer forming the valve seat of the butterfly valve. It therefore provides a direct reading of the inside diameter dimension and the hardness reflected by the impingement of the gage anvils 20 of the plungers 11 into the rubber as indicated with the impingement as indicated at 30. In actual practice, it has been found desirable in the employment of the glass tubing 28 to use a small caliber of tubing imparting in service a relatively high magnification to facilitate accurate reading of the gage measurement, for example of the order of 80 to 1. It will be appreciated that with such magnified reading the observer is able to gage very accurately the inside diameter of the valve seat ring and the hardness measurements encountered within a desired range. The cross-sectional area of tubing 28 is substantially less than that of the cross-sectional area of the gaging plungers 11, thus providing from such ratio the desirable magnification in reading the indicator symbols 34 and 35, when determining the dimension and hardness being gaged.

This desirable flexibility in reading was impossible to employ when using former methods of gaging.

It will also be appreciated that the hydraulic gage of this invention possesses the advantage of another definite use in that the reading obtained from the hydraulic gage can be used to indicate the bubble tightness of the assembled valve seat with the closure member. Due to said magnified reading provided, the finished valve can be grouped or classified by dimensional size and control by means of the modified form of hydraulic gage as will hereinafter be described in the remaining figures.

The size of the butterfly valve disc or closure member in its diametral dimensions will be accurately controlled and thus assure desired bubble tightness of the valve depending upon the mating of the closure member with the rubber-like seat with which it is used.

As above referred to, the modified gage of this invention is employed to incorporate a ring gage for accurately measuring the outside diameter of valve disc or closure for a butterfly or the like.

Figure 5:
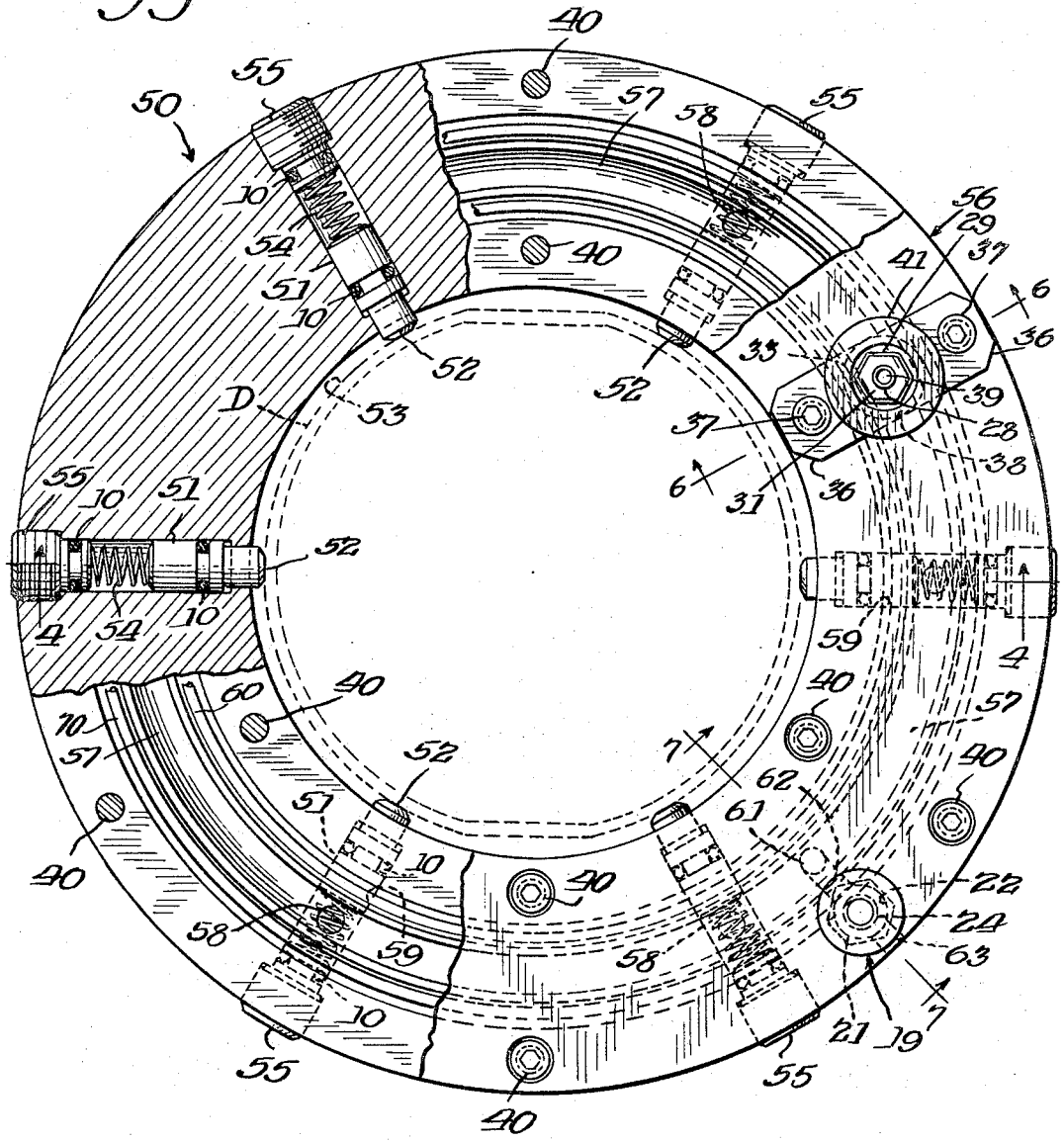
FIG. 5 is a plan view of the modified gage shown in FIG. 4 in fragmentary section and with a butterfly valve closure member being shown in dotted lines, the gage being applied to the closure member while the peripheral measurement thereof are being gaged.

When gaging the outside diameter or outer peripheral surface of the valve closure member, such as the disc designated D in FIG. 5, the gage body generally designated 50 is provided with the axially movable spaced apart plungers 51 radially extending as indicated and having the inner end anvil portions of said gaging plungers suitably formed as at 52 to receive said outer peripheral surface portion 53 of the valve disc D. It will be appreciated that since the plungers 51 are resiliently mounted as by means of the coil springs 54 and are preferably adjustably retained by means of the plugs 55 the outer dimension of the valve disc D is gaged at as many peripheral surface portions as the number of plunger gages employed permit, in this instance, six.

Cooperating in the same manner as previously described in connection with the other figures, the modified gage body 50 is provided with a cap generally designated 56 attached in leakproof relation to the annular groove-like chamber 57 having the spaced apart downwardly extending passages 58 communicating with the radially extending chambers 59 within which the gaging plungers 51 are mounted as shown more clearly in FIG. 4. The chambers 59 as described in connection with the chamber 3 of the first mentioned figures contain a suitable liquid biasing together with the springs 54 the axial movement of the plungers radially outward as the inner end anvil portions 52 of the said portions make contact with the outer periphery 53 of the closure member D.

Figure 7:
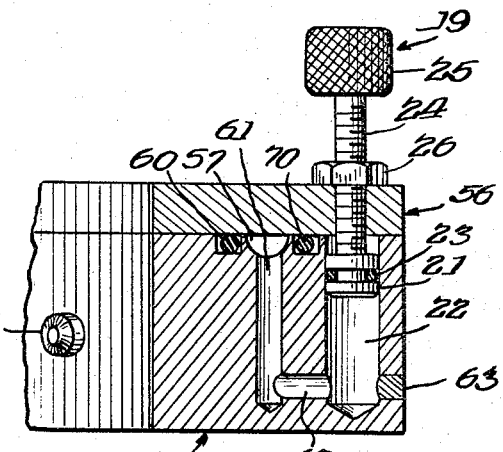
FIG. 7 is a fragmentary sectional view taken on the line 7—7 of FIG. 5.

It will be noted as shown more clearly in FIGS. 5 and 7 that the annular chamber 57 is connected by means of the vertically disposed passage 61 thereby to connect the plunger chamber 22 by means of the transverse passage 62. Thus, the chambers 59 of the respective radially extending plungers 51 are connected by means of the annular chamber 57 and the passages 61 and 62 with the compensating plunger 19.

After the passage 62 has been drilled, a plug 63 is applied as indicated in FIG. 7.

Figure 6:
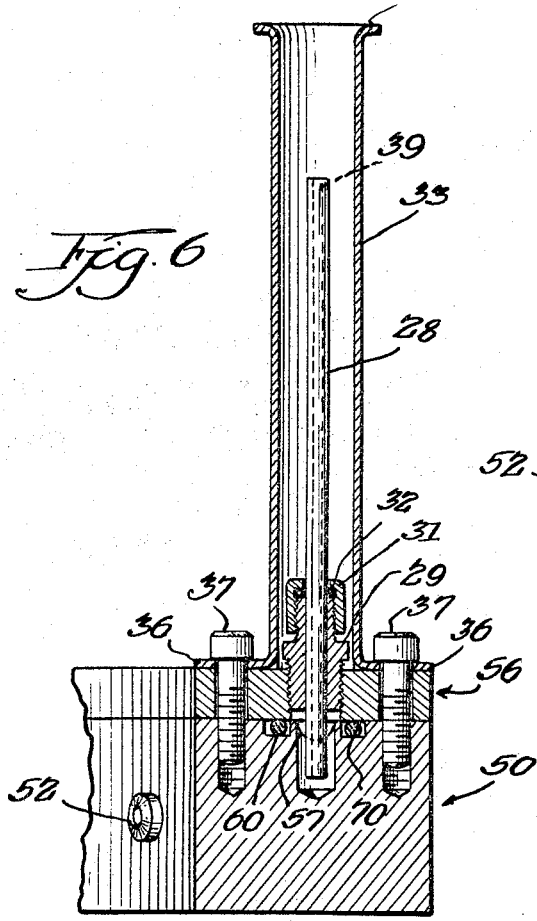
FIG. 6 is a fragmentary sectional view taken on the line 6—6 of FIG. 5.

As shown more clearly in FIG. 6, the visual indicator mechanism 33 is of subtsantially the same construction as that shown in FIGS. 1 and 2, the shield 33 being bolted to the cap by means of the cap screws 37 through the flanges 36. The glass tubing 28 is mounted in substantially the same manner within the bushing 29 provided with the O-ring 32 and the retainer nut 31. It will be appreciated that while not shown in complete detail, the slot 38 is provided (see FIG. 4) and the shield is suitably calibrated in the manner described in connection with FIG. 1.

In considering the operation of this modified form, it will be appreciated that after the body 50 and the cover 56 are assembled the chamber 22, passages 58 and 61, passage 62, and chambers 57 and 59 are filled with liquid, the manner of hydraulic functioning or liquid displacement is identical to that previously described. The equalizing cylinder 19 is omitted in this modified construction since the gaging plungers 51 are applied directly to the outside periphery 53 of the butterfly valve closure D, which latter member is preferably of metal and hardness determinations are not made.

It will be appreciated that the outside diameter or peripheral surface 53 of the closure member D is measured as an average dimension and which dimension is readily struck by merely totalling the movement of plungers depending upon how many are used.

It should be understood that while only a pair of embodiments have been shown and described, the invention is capable of being applied to a wide variety of gage or measuring devices employing the principle. The invention therefore should be measured by the scope of the appended claims interpreted in light of the art.

I claim:
1. An annular displacement gage for measuring a diametral dimension including:
 (a) an annular gage body;
 (b) a liquid chamber comprising an annular groove in an end surface of and concentric with said annular gage body;
 (c) cover means secured to said end surface of said body and sealingly enclosing said groove;
 (d) a plurality of radially disposed cylinders in said body and a plurality of passages in said body, each passage providing communication between one of said cylinders and said chamber;
 (e) a plurality of resiliently mounted gaging plungers positioned in said cylinders limitedly movable relative to said body;
 (f) a liquid in said chamber, cylinders and passages;
 (g) liquid level indicator means communicating with said body chamber; and,
 (h) a compensating plunger communicating with said body chamber for adjusting the height of the liquid level in said indicator means.

2. The subject matter of claim 1 wherein said compensating plunger includes a screw means integral with said plunger and adjustably positioned on said cover means.

3. A liquid displacement gage for measuring seats and closure members therefor in butterfly valves or the like, the said gage means for measuring the diameters of the seats and closure members including:
 (a) a hollow gage body;
 (b) a liquid chamber centrally positioned in said body;
 (c) a liquid in said chamber;
 (d) cover means for said body and chamber;
 (e) a plurality of radially disposed cylinders in said body in communication with said chamber;
 (f) a plurality of gaging plungers positioned in said cylinders movable relative to said body, said plungers adapted to contact a seat member or the like;
 (g) compensating plunger means for displacing liquid within said body;
 (h) visual indicator means communicating with said liquid in said chamber, said cover supporting said visual indicator means and said compensating plunger means;
 (i) a hollow equalizing cylinder positioned in said chamber, said cylinder being transversely movable relative to said gaging plungers; and
 (j) resilient means between each of said gaging plungers and said cylinder, said resilient means adapted to urge said cylinder into an equalized position.

4. The subject matter of claim 3 and further including a plurality of transverse passages extending through the wall portions of said cylinder.

5. The subject matter of claim 3 wherein said visual indicator means includes a tubular member received within said equalizing cylinder.

6. The subject matter of claim 3 wherein said visual indicator means further includes an open end tubular means communicating directly with said hollow portion of said equalizing cylinder.

7. The subject matter of claim 3 and further including adjustable means adapted to position said compensating plunger.

References Cited

UNITED STATES PATENTS

| | | | |
|---|---|---|---|
| 1,658,994 | 2/1928 | Lauer | 33—178 |
| 1,660,469 | 2/1928 | Bath | 33—178 |
| 1,676,248 | 7/1928 | Bryant | 33—178 |
| 1,752,964 | 4/1930 | Prange | 33—147 |
| 2,452,753 | 11/1948 | Hathaway | 33—147 |

FOREIGN PATENTS 509,718   7/1939   Great Britain.

SAMUEL S. MATTHEWS, *Primary Examiner.*